US008660424B2

(12) United States Patent  (10) Patent No.: US 8,660,424 B2
Achkir et al.  (45) Date of Patent: Feb. 25, 2014

(54) SCALABLE HIGH SPEED GIGABIT ACTIVE BUNDLE LINK AND TESTER

(75) Inventors: D. Brice Achkir, San Jose, CA (US); Hugh Barrass, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 534 days.

(21) Appl. No.: 12/869,048

(22) Filed: Aug. 26, 2010

(65) Prior Publication Data

US 2012/0051735 A1  Mar. 1, 2012

(51) Int. Cl.
*H04B 10/08* (2011.01)
*H04B 17/00* (2006.01)

(52) U.S. Cl.
USPC .................... 398/22; 398/9; 398/16; 398/135

(58) Field of Classification Search
USPC .......................................... 398/9, 16, 22, 135
See application file for complete search history.

(56) References Cited

U.S. PATENT DOCUMENTS

| | | | |
|---|---|---|---|
| 7,099,438 | B2 | 8/2006 | Rancu et al. |
| 7,257,082 | B2 | 8/2007 | Dugatkin |
| 7,516,216 | B2 | 4/2009 | Ginsberg et al. |
| 7,555,222 | B2 | 6/2009 | Rossetti et al. |
| 7,599,618 | B2 * | 10/2009 | Adam et al. .................... 398/16 |
| 7,627,669 | B2 | 12/2009 | Dugatkin et al. |
| 2004/0086003 | A1 * | 5/2004 | Natarajan et al. ............. 370/545 |
| 2005/0265717 | A1 * | 12/2005 | Zhou .................................. 398/9 |
| 2006/0291857 | A1 * | 12/2006 | Mackenzie et al. ............... 398/9 |
| 2007/0230355 | A1 | 10/2007 | Ueda |
| 2011/0182191 | A1 * | 7/2011 | Jackson ........................ 370/250 |

FOREIGN PATENT DOCUMENTS

EP  1684446 A2  7/2006

OTHER PUBLICATIONS

International Search Report and Written Opinion dated Jun. 7, 2011 in International Application No. PCT/US2010/055192.
P. Drolet et al., "100G Ethernet and OTU4 Testing Challenges: From the Lab to the Field", IEEE Communications Magazine, Jul. 1, 2010, vol. 48, No, 7, pp. 78-82.

* cited by examiner

*Primary Examiner* — Daniel Dobson
(74) *Attorney, Agent, or Firm* — Edell, Shapiro & Finnan, LLC (57) ABSTRACT

A scalable signal processing test device and related signal processing techniques are provided herein for processing signals at a signal processing module of the scalable signal processing test device. Source electrical signals are processed to generate test electrical signals that model electrical signals produced by an optical module from received optical signals in accordance with a high speed optical standard for optical transmission. The test electrical signals are transmitted over transmit links to a host device that is configured to receive the test electrical signals in a format that would normally be produced by an optical module in accordance with the high speed optical standard. The test electrical signals are received after they have been looped back from the host device over receive links from the host device. The host device is a device that is configured to output the test electrical signals in a format suitable for processing by an optical module in accordance with the high speed optical standard. The test electrical signals received from the host device are analyzed in order to determine whether the host device outputs the one or more sets of test electrical signals in compliance with the high speed optical standard.

32 Claims, 8 Drawing Sheets

SCALABLE HIGH SPEED GIGABIT ACTIVE BUNDLE LINK AND TESTER

TECHNICAL FIELD

The present disclosure relates generally to network test equipment and more specifically to a scalable test card that has a scalable number of 10 Gigabit/second (Gb/s) communication test links.

BACKGROUND

In the field of networked communication and network transport devices, industry standards are evolving to support ever increasing data transport rates. For example, the IEEE 802.3 family of data link layer standards specify requirements for equipment for Ethernet LAN and WAN applications, and will support speeds faster than 10 gigabits per second (G) (e.g., 40 G and 100 G) over copper links and optical links. Moreover, the IEEE 802.3ba standard specifies 40/100 G interfaces based on parallel optical and copper links. Network equipment needs to interface and connect with each other to support these higher data transport rates.

Interface technologies known to accommodate connectivity of network equipment include, for example, the C-Form-Factor Pluggable (CFP) standard and the Quad Small Form-Factor Pluggable (QSFP) standard. The CFP standard comprises ten 10 G channels or lanes in each direction that are transported in parallel, e.g., lanes that are similar to XFI or Serializer-Deserializer (SerDes) Framer Interface (SFI) lanes. Thus, a CFP transceiver may support multiples lanes of 10 G transport up to 100 G, e.g., one 100 G Ethernet (GE) or OTU4 signal, two 40 GE or two OTU3 signals, etc. When transported over an optical link via the CFP transceiver the signals are subject to optical dispersion, such as chromatic, modal, and Polarization Mode Dispersion (PMD). When converted to electrical signals at the receive end, the dispersion may be partially compensated for using Electronic Dispersion Compensation (EDC). When transported over a copper link via the CFP transceiver the signals are subject to attenuation, crosstalk and noise interference. The degradation of the signal over the copper link is, in many ways, analogous to that experienced by optical signals.

DESCRIPTION OF EXAMPLE EMBODIMENTS

Overview

A scalable signal processing test device and related signal processing techniques are provided herein for processing signals at a signal processing module of the scalable signal processing test device. One or more sets of source electrical signals are processed according to a first predetermined number of configurable signal processing parameters in order to generate one or more sets of test electrical signals that model electrical signals produced by an optical module from received optical signals in accordance with a high speed optical standard for optical transmission. The one or more sets of source electrical signals were not converted to or from optical signals. The host device is a device that is configured to receive the one or more sets of test electrical signals in a format that would normally be produced by an optical module in accordance with the high speed optical standard. The one or more sets of test electrical signals are received after they have been looped back from the host device over a predetermined number of receive links from the host device that is configured to output the one or more sets of test electrical signals in a format suitable for processing by an optical module in accordance with the high speed optical standard.

The one or more sets of test electrical signals received from the host device are analyzed according to a second predetermined number of configurable signal processing parameters in order to determine whether the host device outputs the one or more sets of test electrical signals in compliance with the high speed optical standard. The analysis may be performed by generating one or more diagnostic parameters from the one or more sets of test electrical signals. The one or more diagnostic parameters may include a bit error rate, a packet error rate or jitter measurement, a signal eye diagram, or standard signal eye diagram measurements.

Example Embodiments

Figure 1:
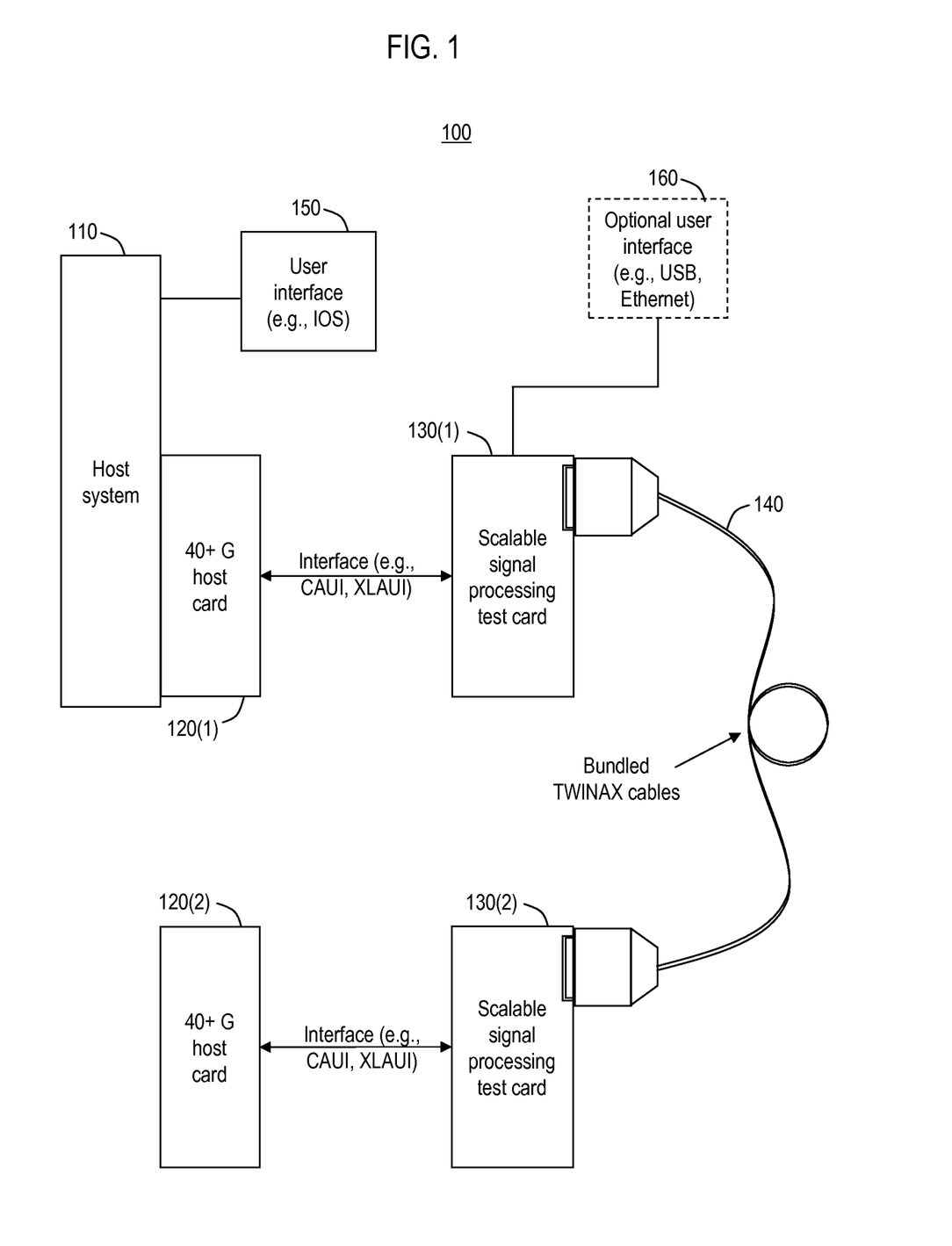
FIG. 1 is an example of a block diagram of a test system that employs scalable signal processing test cards.

Reference is first made to FIG. 1. FIG. 1 shows a test system 100 that is configured to test ports on network interface cards. The system 100 comprises a host system 110, two 40+G network interface host cards 120(1) and 120(2), two scalable signal processing test cards 130(1) and 130(2), and a test cable 140, e.g., with a plurality of twinaxial (TWINAX) cables that are bundled together. As used herein, "40+G" refers to 40 G or greater data rates. The host system 110 has a user interface (UI) 150, e.g., an embedded Internetwork Operating System (105). The scalable signal processing test card 130(1) has an optional user interface 160, e.g., a Universal Serial Bus (USB) or Ethernet port that may be coupled to a general purpose computer, e.g., a Personal Computer (PC) or laptop. A PC may also connect to the host system 110 through a serial port or through a remote session, thereby enabling a test engineer to configure the host system 110, the host card 120(1), and the scalable signal processing test card 130(1).

The host system 110 is, for example, a network switch, and is also referred to herein as a host device or simply a host. The host cards 120(1) and 120(2) may be, for example, configurable network interface line cards for the network switch, and are also referred to herein as a line card, while the scalable signal processing test cards 130(1) and 130(2) may be referred to herein as test cards or test devices.

Each of the scalable signal processing test cards 130(1) and 130(2) is configured to be plugged in, or pluggable, to a corresponding one of the host cards 120(1) and 120(2) using an interface standard, e.g., C Attachment Unit Interface (CAUI) or XAUI, where "C" in CAUI stands for 100 and X in XAUI stands for 10. The host cards and the test cards exchange data according to a pluggable communications standard, e.g., CFP, CXP or the QSFP standard, as will be described hereinafter. Accordingly, the test cards may be CFP modules or, alternatively, they may be Fixed Transceiver (FT) modules. Thus, the pluggable connector for test cards 130(1) and 130(2) is similar to CFP, CXP, or QSFP (optical or copper) module form factors thereby leveraging their existing mechanical design.

The combination of the two test cards 130(1) and 130(2) and TWINAX test cable 140 may be referred to as a test "bundle". Each bundle is composed of two CFP, CXP, or QSFP mechanical cases or shells connected through TWINAX cables. Inside the mechanical case, EDC components (supporting data rates of 8 to 11 Gb/s per channel or greater) are provided for channel cleaning, stress generation, pre-emphasis, equalization, and traffic generation and detection. The signals flowing between the two shells are conditioned, thereby rendering TWINAX cables adequate for transmission.

Internet applications, collaboration tools, video streaming and conferencing, and High Performance Computing (HPC) applications are proliferating at an increasing rate. These applications are creating an ever larger demand for speed and bandwidth. In the current networking environment, 10 G links are well deployed with some systems employing 40 G over a Synchronous Optical Network (SONET) or Synchronous Digital Hierarchy (SDH) networks for transport. There is a transition in the marketplace to Ethernet with higher data rates. For example, 40 GE, 100 GE and 120 Gb/s systems are seeing an increasing number of deployments.

The transition to 40 GE, 100 GE and 120 Gb/s requires new designs to meet the IEEE 802.3ba standard or International Telecommunication Union (ITU)-T recommendations. The 40 GE/100 GE/120 G architectures continue to build on the modularity architecture of prior systems by leveraging the pluggable scheme or FTs. The pluggable or FT 40 GE/100 GE/120 G clients can be optical or copper based, i.e., they may be optical transceivers or wireline (traditional copper) transceivers. The electrical interface of the CFP, CXP, QSFP, or FT modules (optical or copper) is almost identical. The electrical interface is an aggregation of 10 Gb/s serial channels, e.g., 12 serial channels are used for 120 G, 10 serial channels for 100 G, or 4 serial channels for 40 G. The described electrical high speed serial interface between the host and the transceiver is the CAUI standard for example, as described above. The high speed serial interface suffers from cross talk between the serial channels and the electrical traces need to be engineered with identical length to prevent channel delay. Signal pre-emphasis and equalization signal processing becomes proportionally more complex at the higher data rates that are being adopted in the marketplace.

Figure 2:
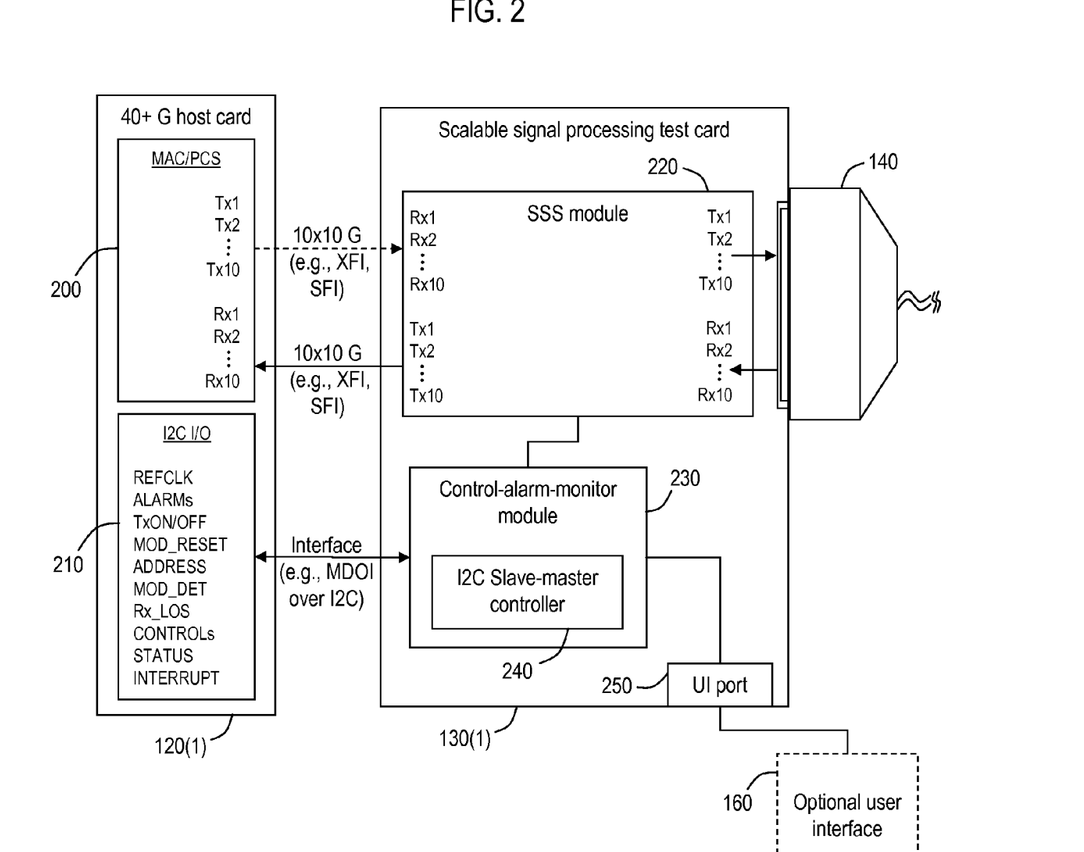
FIG. 2 is an example of a block diagram illustrating a portion of the test system of FIG. 1 in more detail.

Referring to FIG. 2, a block diagram of a portion of test system 100 is shown with line card 120(1) and test card 130(1) illustrated with their relevant internal components. Line card 120(1) further comprises a Media Access Control (MAC)/Physical Code Sublayer (PCS) module 200 and an I2C based Input/Output (I/O) module 210. The test card 130(1) has a Signal cleaner, Stress generator, and Signal Processing (SSS) module 220; a control-alarm-monitor module 230 with an I2C slave/master controller 240; and a UI port 250 configured to be coupled to the optional user interface 160. The control-alarm-monitor module 230 may be referred to herein as control module 230 and the I2C slave/master controller 240 may be referred to as I2C controller 240.

In this example, MAC/PCS module 200 has ten 10 G transmit (TX) links labeled Tx1-Tx10 and 10 receive (RX) links labeled Rx1-Rx10. SSS module 220 has corresponding RX and TX links forming 10 "chip-to-chip" lanes in each direction. Dashed lines with arrows are used herein for signals proceeding in a direction outbound from the host card and solid lines with arrows are used herein for signals proceeding in a direction inbound to the host card. The transmit and receive links are configured to use serial transmission, e.g., using XFI or SFI lanes, as shown. For example, XFI is a 10 gigabit per second chip-to-chip electrical interface specification defined as part of the XFP multi-source agreement. Examples of XFI applications are 10 GE, 10 G Fiber Channel, SONET OC-x, SDH STM-x, 10 G OTN OTU-2, and parallel optics links. Each XFI lane can carry 10 G data in either direction, and for ease of description the 10 G lanes are unidirectional. In one example, there are 4 XFI lanes and in another example, there are 10, 12, or 16 XFI lanes. Alternatively, each XFI lane may carry 25 G of data to accommodate future standards under consideration by the IEEE, for example, for any 100 GBASE application.

The IEEE 802.3ba standard describes a group of 10 chip-to-chip interface lanes conveying 100 GE or a group of 4 chip-to-chip interface lanes conveying 40 GE known as CAUI and XLAUI, respectively. These CAUI and XLAUI lanes individually resemble XFI lanes in many respects. A group of 10 lanes connecting linearly to the physical medium or a group of 4 lanes connecting linearly to the physical medium are described in the IEEE 802.3ba standard as CPPI and XLPPI, respectively. These CPPI and XLPPI lanes individually resemble SFI in many respects.

SSS module 220 also has ten 10 G transmit outputs to transmit signals received from MAC/PCS module 200 in the host line card 120(1) over test cable 140, and ten 10 receive inputs to receive signals from test cable 140 for transmission to MAC/PCS module 200 in the host line card 120(1). SSS module 220 is configured to perform various forms of signal processing on signals traversing module 220 in both directions, e.g., EDC, noise or stress injection, etc., and will be described hereinafter in connection with FIG. 5.

An interface or a bus connection is provided between the control module 230 and the I2C I/O module 210 to allow the I2C controller 240 to communicate with line card 120(1). For example, a management data input/output (MDIO) bus structure may be provided for the bus connection. MDIO is a bus structure defined for Ethernet, i.e., by IEEE 802.3. It is implemented by two I2C pins or a two line connection, an MDIO pin and a management data clock (MDC) pin. The MDIO interface is used for monitoring optical parameters and for functional control. The MDIO bus is one example communication standard for out of band communication, but there are other techniques, now known or hereinafter developed, that may be useful for host card and test card communication. Example MDIO one-way or exchanged I/O parameters are shown within I2C I/O module 210. The MDIO parameters are described in the paragraphs that immediately follow.

REFCLK refers to the host card clock that is sent to control module 230.

ALARM refers to signaling from the control module 230 to the I2C I/O module 210 for alarm, control and monitor functions that the control module 230 has with respect to the host card 120(1).

TXON/OFF is a signaling scheme for indicating state of the host card 120(1) in terms of readiness to receive signals from the test card 130(1). When TXON/OFF is asserted, the output of the SSS module 220 to the host card 120(1) is turned off. When TXON/OFF is de-asserted, the transmit links of the SSS module 220 are turned on according to a predefined TX turn-on process.

MOD_RESET is an active-low logic signal. When MOD_RESET is asserted, the test card 130(1) enters a reset state, and conversely when it is de-asserted, the test card 130(1) comes out of the reset state.

ADDRESS represents the MDIO physical port addresses used to address all of the ports contained within the host card 120(1). The physical port address lines are driven by the host card 120(1) to set the SSS module 220 physical port addresses to match the address specified in the MDIO frame.

MOD_DET is a module detect output signal from the control module 230 to the host card 120(1). MOD_DET asserts a "low" or ground condition when the test card 130(1) is plugged into the host card 120(1) and is asserted "High" when the test card 130(1) is physically absent from a host card 120(1), i.e., it is high when not pulled to ground by the presence of the test card 130(1).

RX_LOS is a receiver loss of signal indicator signal. When asserted, it indicates the received optical power of the SSS module 220 is lower than the expected optical power alarm threshold, which is application specific. The techniques described herein eliminate the need for actual optical signals which will be explained hereinafter.

CONTROLs are control signals that allow the host card 120(1) to program certain controls functions via a hardware pin.

STATUS provides status information about test card 130(1) to the host card 120(1).

INTERRUPT provides interrupts between test card 130(1) to the host card 120(1).

I2C I/O packets may be used to exchange other information, e.g., test data, test results, or test configuration information.

I2C controller 240 may be configured to act as an I2C slave or as an I2C master. A master device is a device that is a bus controller at the present time. The I2C master device controls the clock and generates START and STOP signals. Slave devices listen to the bus and act on the controls and data that they are sent. The master can send data to a slave or receive data from a slave. Slaves do not transfer data between themselves. In this example, when the optional UI 160 is attached to the UI port 250 the I2C controller 240 may be configured to act as an I2C master, or detect the presence of the UI 160 and become master using a takeover mechanism. When the UI 160 is not present, the I2C controller 240 is configured to act as an I2C slave.

Currently, in the 40+G test environments on the link side, i.e., to and from the host card 120(1), only optical transceiver modules are available for media test purposes. Also, there are no available test solutions that allow scaling the number of 10 G links for manufacturing and host card qualification, or to guarantee the performance of the host. Optical test solutions tend to be expensive and present additional PMD and Polarization Dependent Loss (PDL) fiber signal processing requirements. In addition, signals conditioning and processing is handled by the host card to overcome printed wire circuit and external media impairments in order to reduce the cost of the pluggable optical modules.

The techniques described herein eliminate the need for an optical test environment by providing copper transmission between network elements and copper test modules that use signal processing techniques to mimic or model optical transmission modules and optical fiber transmission in order to qualify host communication for optical environments. In other words, the optical test environment is simulated using electrical components and electrical signals. Consequently, the one or more sets of test electrical signals are generated from one or more sets of source electrical signals that were not converted to or from optical signals. That is, the one or more sets of test electrical signals model the optical signals that would be transmitted or received across an optical link.

Figure 3:
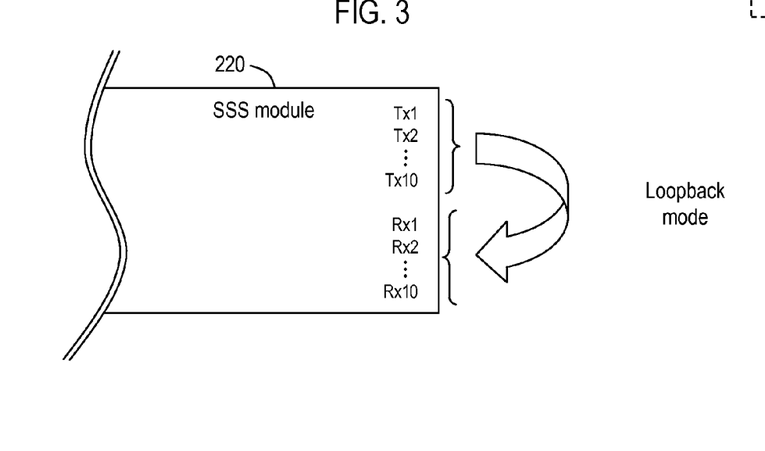
FIG. 3 is an example of a block diagram of a scalable signal processing test card in loopback mode.

In another example, the ten TX outputs of the SSS module 220 may be routed back to the RX inputs instead of sending and receiving signals over test cable 140. This "loopback" mode is shown in FIG. 3. Thus, the test card 220 may operate in two modes. In the first mode the two test cards 130(1) and 130(2) operate in tandem and rely on communication over test cable 140. In the second mode, a test card is placed in loopback mode and operates without a test cable and without a second test card. The operation of the test cards in either mode is almost identical and will be described in greater in connection with FIGS. 5-8.

Figure 4:
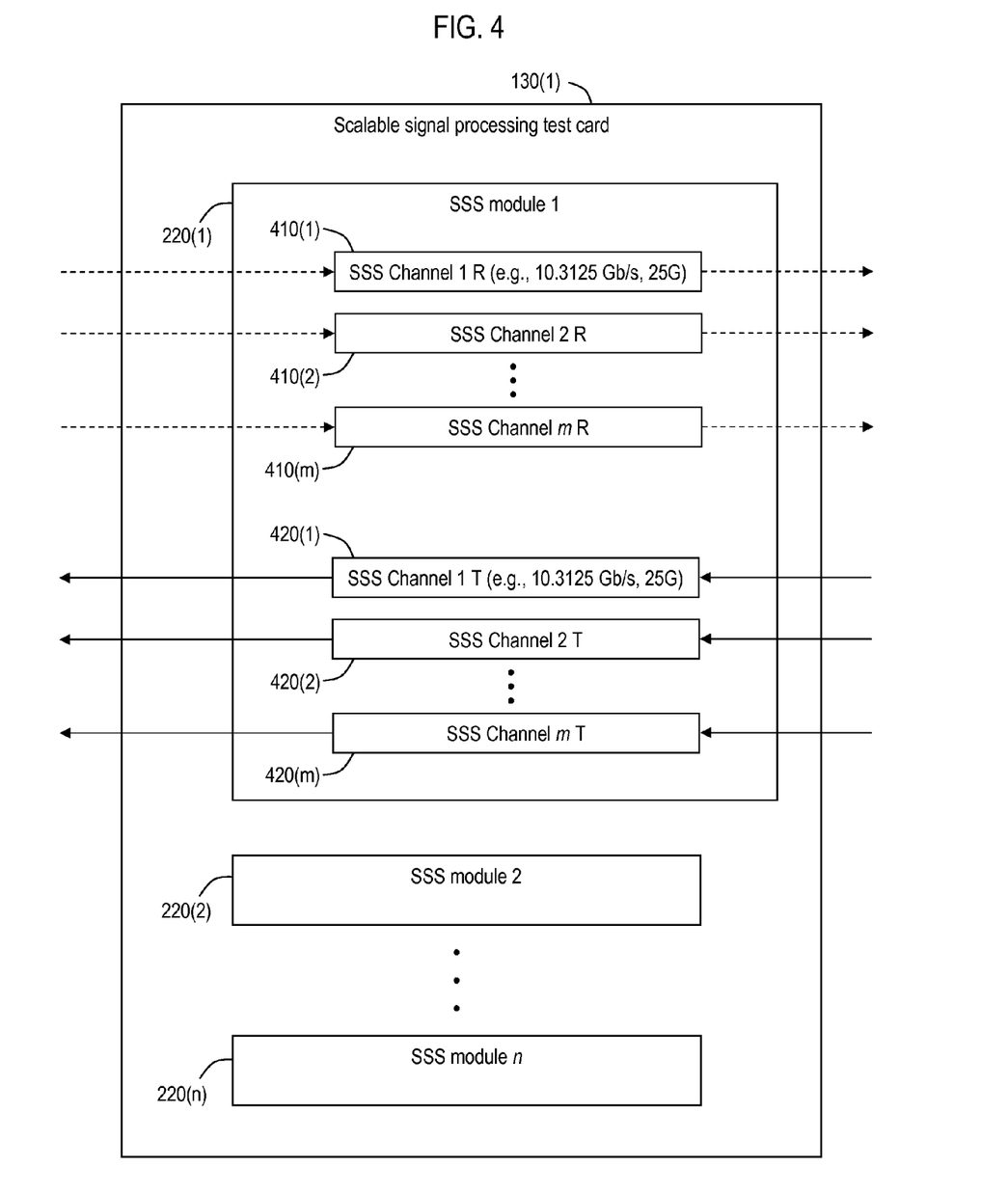
FIG. 4 is an example of a block diagram illustrating the scalable features of the scalable signal processing test card with a scalable number of signal processing modules each with a scalable number of a signal processing channels.

Turning now to FIG. 4, a block diagram is shown that illustrates the scalable features of a scalable signal processing test card, e.g., test card 130(1), this diagram and the following description is also applicable to test card 130(2). The test card 130(1) has a plurality of SSS modules 220(1)-220(n). Each of the SSS modules 220(1)-220(n) has a scalable number of a signal processing channels. In this example, SSS module 220(1) is shown with a plurality of SSS receive channels 410(1)-410(m) that are configured to receive signals from a host card and transmit them over a test cable or transmit them via loopback within the test card. SSS module 220(1) also has a corresponding number of SSS transmit channels 420(1)-420(m) that are configured to transmit received signals to a host card and the receive signals can originate from the test cable or from the loopback from SSS receive channels 410(1)-410(m) in the test card.

Thus, the test card 130(1) may be scaled for a wide variety of data rates. For example, to support 40 G data rates a test card may be deployed with one SSS module that has four 10 G RX and TX SSS channels or single 40 G RX and TX SSS channels, or a test card may be deployed with four SSS modules that each have single 10 G RX and TX SSS channels. To support 100 G data rates the test card may have a single SSS module with ten 10 G RX and TX SSS channels, e.g., similar to the configuration shown in FIG. 2, or the single SSS module may use four 25 G SSS channels. A ten 10 G channel (10×10 G=100 G) test card could disable two channels to support 2 40 G applications or disable six channels to support a single 40 G application. A 16 10 G channel 10 G (16×10 G=160 G) test card could disable two channels to support one 100 G and one 40 G application, disable four channels to support one 120 G application, or disable six channels to support a single 100 G application. As can be seen, the test card can be scaled to accommodate future data transmission standards under consideration by the IEEE and future mechanical pluggable form factors designs that may also be considered.

Figure 5:
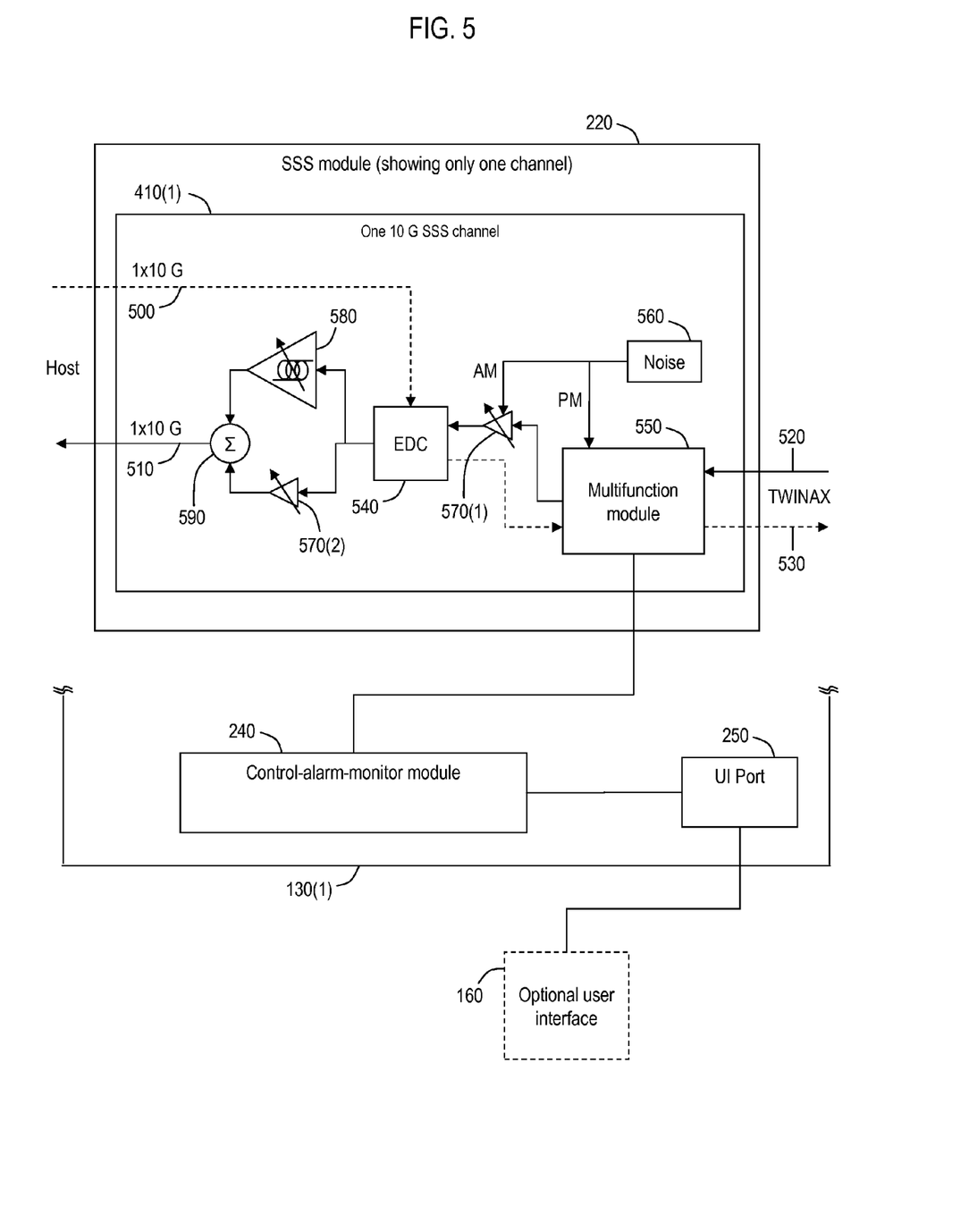
FIG. 5 is an example of a block diagram illustrating a single signal processing channel of the scalable signal processing test card and its related connectivity environment.

Referring to FIG. 5, SSS module 220 is shown with the relevant components of a single 10 G SSS channel, e.g., SSS channel 410(1). The 10 G SSS channel 410(1) is configured to receive 10 G signal 500 from the host and transmit 10 G signal 510 to the host, and receive 10 G signal 520 from the TWINAX cable and transmit 10 G signal 530 to the TWINAX cable. SSS channel 410(1) has an EDC unit or module 540, a multifunction module 550, a noise generation module 560, variable amplifiers 570(1) and 570(2), variable delay and variable amplifier 580, and signal mixer 590. The modules inside one SSS channel 410(1) may be implemented by discrete hardware components or one or more integrated circuit devices.

Signal 500 is passed to EDC module 540 as it is received. EDC module 540 performs any necessary EDC on signal 500, e.g., signal equalization, and passes the signal 500 to multifunction module 550. Multifunction module 550 is configured to perform Bit Error Rate Tests (BERT), Packet Error Rate Tests (PERT), and generate a virtual "eye" diagram based on signal 500. Multifunction module 550 may also be configured to generate eye diagram amplitude and time measurements, e.g., eye amplitude, eye crossing amplitude, vertical eye opening, eye crossing time, eye delay, jitter, and the like. Multifunction module 550 is also configured to perform EDC functions and loop signal 500 back to the host line card, if so configured. Multifunction module 550 is also configured to generate test signals in lieu of receiving 10 G signal 520 or looping signal 500 back to the host. After processing by multifunction module 550, signal 500 is transmitted as signal 530 to another device, e.g., another test card, over TWINAX.

Signal 520 is passed to multifunction module 550 as it is received. Multifunction module 550 performs EDC operations that are configured to mitigate any impairment due to all components in the signal path, e.g., TWINAX, connector, circuit board, etc., impairments. Multifunction module 550 may perform EDC operations to sharpen the virtual eye pattern of modulated signals. Multifunction module 550 receives Phase Modulation (PM) jitter from noise module 560 and applies the PM jitter to signal 530 in order to degrade the signal. Signal 530 is then passed to amplifier 570(1) that is modulated by an Amplitude Modulation (AM) signal coming from noise module 560 to induce amplitude jitter onto signal 530 in order to further degrade the signal.

Signal 530 is passed to EDC module 540 which further conditions and degrades the signal with custom or known stress signals, e.g., a symmetric-cursor stress characteristic, a pre-cursor stress characteristic, a post-cursor stress characteristic, or a custom stress characteristic. The signal 530 is split at the output of EDC module 540. A portion of signal 530 goes through variable amplifier 570(2) to adjust the amplitude of that portion of the signal. Another portion of signal 530 goes to variable delay and variable amplifier 580 to create a delayed copy of the signal. The amplification levels applied to each portion of the signal by amplifiers 570(2) and 580 need not be the same. The two portions of the signal are added together by mixer 590 and transmitted to the host as 10 G signal 510.

The functions of the various components of the SSS channel 410(1), e.g., modules and amplifiers, are configurable by optional UI 160. In one example, the control module 240 is configured to communicate via HTML or XML to a browser located on UI 160 via UI port 250 or by other communication means to a custom UI application running on the UI 160. The control module 240 then configures parameters for the various modules and amplifiers on the SSS channel 410(1) based on commands received from UI 160. Other SSS modules in test card 130(1) may be configured in a similar fashion. In another example the test card 130(1) may operate without UI 160 and is configured via the I2C bus by the host system via the host system's IOS.

Figure 6:
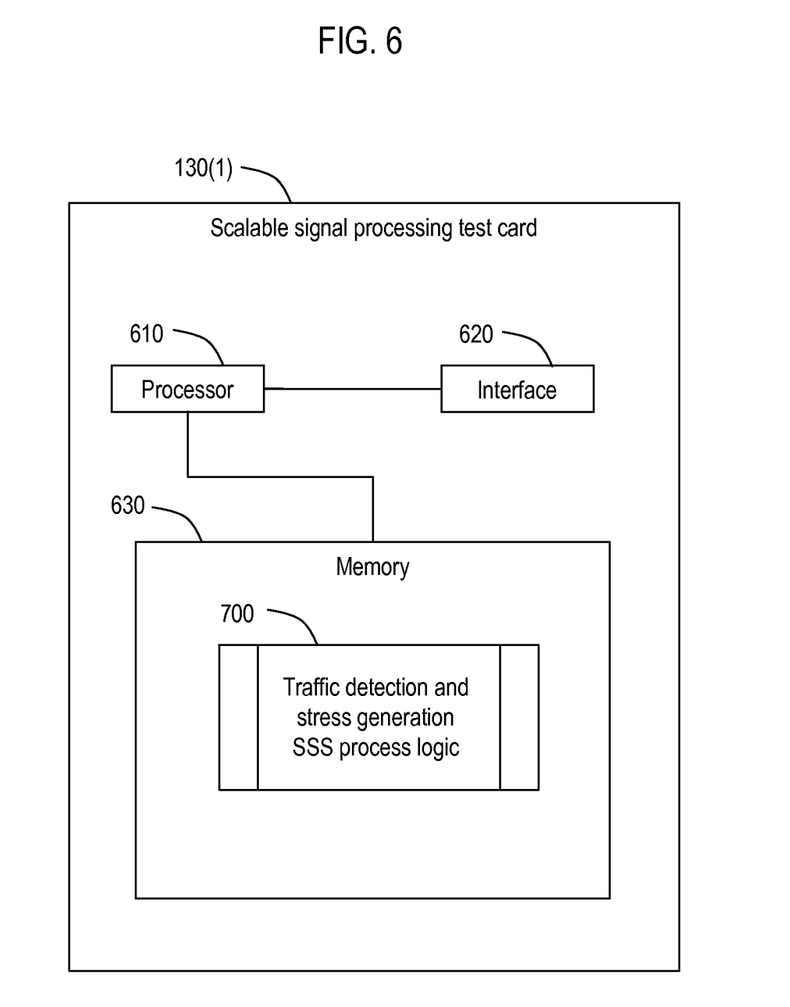
FIG. 6 is an example of a block diagram illustrating components of a control section of the scalable signal processing test card.

Referring to FIG. 6, an example of a logical block diagram of a scalable test card, e.g., test card 130(1), is shown that is configured to test and qualify the operational capability of host cards. The components shown in FIG. 6 are logically grouped according to function and comprise a data processor 610, an interface 620, and a memory 630. Resident in the memory 630 is software for traffic detection and stress generation process logic 700, e.g., that may be performed by test card 130(1). The components are shown as a logical grouping for simplicity of description with respect to the various embodiments or circuit designs that may be contemplated. For example, the operations of the data processor 610 may represent the distributed processing capability of the test card 130 in which some processing is performed by processing capabilities of the control-alarm-monitor module 240 (FIG. 5), while other processing may be performed by EDC module 540 or multifunction module 550. The process logic 700 has been generally described above in connection with FIGS. 1-5 and will be described in addition detail in connection with FIG. 7.

The data processor 610 is, for example, a microprocessor, a microcontroller, systems on a chip (SOCs), or other fixed or programmable logic. The memory 630 may be any form of non-volatile memory (NVM), random access memory (RAM), or other tangible (non-transitory) memory media that stores data or instructions used for the techniques described herein. The memory 630 may be separate or part of the processor 610, or distributed in the various components of the test card 130(1). Instructions for performing the process logic 700 may be stored in the memory 630 for execution by the processor 610 such that when executed by the processor, causes the processor to perform the operations describe herein in connection with FIG. 7. The interface 620 enables communication throughout test system 100 shown in FIG. 1, e.g., interface 620 may provide a separate Ethernet network connection to the host system that is separate from the I2C connection and the 10 G links of the SSS modules.

The functions of the processor 610 may be implemented by a processor or computer readable tangible (non-transitory) medium encoded with instructions or by logic encoded in one or more tangible media (e.g., embedded logic such as an application specific integrated circuit (ASIC), digital signal processor (DSP) instructions, software that is executed by a processor, etc.), wherein the memory 630 stores data used for the computations or functions described herein (and/or to store software or processor instructions that are executed to carry out the computations or functions described herein). In one example, the operations of the EDC module and the multifunction module may be implemented in a single ASIC, while the operations the control-alarm-monitor module may be implemented by a microcontroller or DSP, or the operations may be shared across processing components. Thus, the operations of the process logic 700 may be implemented with fixed logic or programmable logic (e.g., software or computer instructions executed by a processor or field programmable gate array (FPGA)).

The memory 630 may also store built in test monitoring features for checking the performance of the test modules themselves, the number of times the module has been inserted into a host card, and to compare internally measured parameters to previously stored parameters. For example, the outputs of the test cards may need to be periodically calibrated and compensation parameters for the various signal processing features are stored in NVM. These compensation parameters may be monitored against internal test functions as an interim confidence check or for internal self test functions. The compensation parameters may be updated over time as the test card ages, e.g., a six month or annual calibration, or after a certain number of card insertions.

Referring to FIGS. 7a-7d, and with continued reference to FIGS. 1 and 2, traffic detection and stress generation process logic 700 will now be described. At 710, at a signal processing module, e.g., SSS module 220, of a scalable signal processing test device, e.g., test card 130(1), one or more sets of source electrical signals are processed according to a first predetermined number of configurable signal processing parameters in order to generate one or more sets of test electrical signals that model electrical signals produced by an optical module from received optical signals in accordance with a high speed optical standard for optical transmission. As explained above, the one or more sets of source electrical signals were not converted to or from optical signals.

Figure 7A:
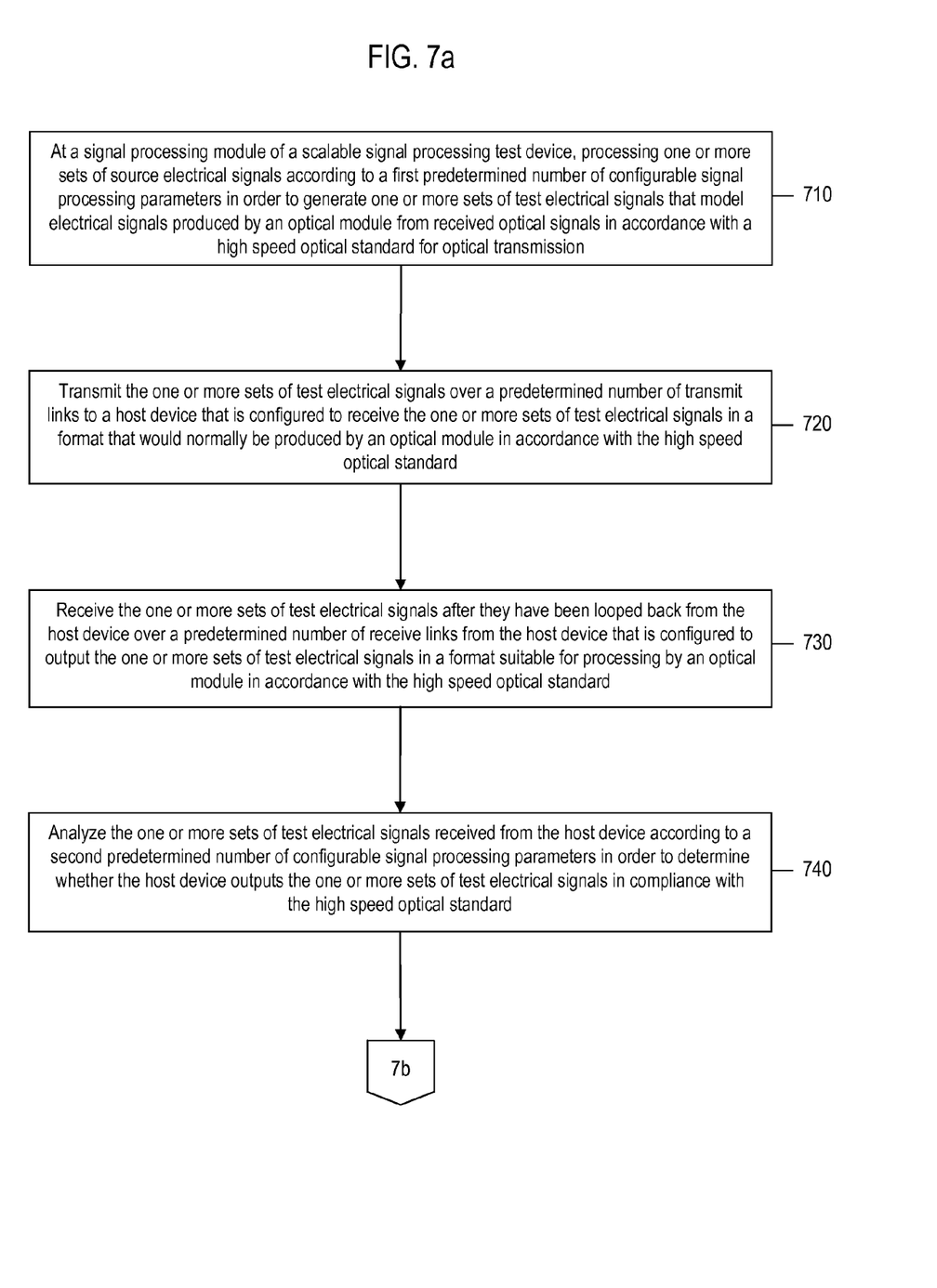
FIGS. 7a, 7b, 7c and 7d illustrate an example of a high level flow chart depicting operations of the scalable signal processing test card.

The source signals may be from the host device for loopback to the host device via the test card, from another external device via the TWINAX 140 (e.g., from another test card), or internally generated by SSS module 220. The test signals are designed to test the operational status of a host and host card, e.g., host system 110 and host card 120(1). In general, an individual "set" of signals may be associated with each TX or RX portion of an SSS channel. The source signal may be conditioned and transmitted over the TWINAX cable 140 to another test module, e.g., test card 130(2). The source signals may be amplified with a gain that is configured to account for attenuation of the source electrical signals when transmitted over an electrical cable, e.g., TWINAX cable 140, to another device (e.g., another test card) and so as to model optical transmission of optical signals derived from the source electrical signals over an optical fiber.

At 720, the one or more sets of test electrical signals are transmitted over a predetermined number of transmit links to a host device that is configured to receive the one or more sets of test electrical signals in a format that would normally be produced by an optical module in accordance with the high speed optical standard. As described above, the 40+G systems have been designed for optical transmission. If the host card can be configured for a test mode, the host card may be sent certain bit sequences from the test card that are known to the host card. The host card can then report or log any receive errors. Any received test signals may be looped back by the host card to the test card.

At 730, the one or more sets of test electrical signals are later received by the test card after they have been looped back from the host device over a predetermined number of receive links from the host device that is configured to output the one or more sets of test electrical signals in a format suitable for processing by an optical module in accordance with the high speed optical standard. Thus, the test card has the original source signals sent as test signals to the host that are designed to test the host and a new set of test signals that have been processed through the host. The source signals and the test signals received from the host may be compared to assess host signal processing.

At 740, the one or more sets of test electrical signals received from the host device are analyzed according to a second predetermined number of configurable signal processing parameters in order to determine whether the host device outputs the one or more sets of test electrical signals in compliance with the high speed optical standard. The analysis may be performed by generating one or more diagnostic parameters from the one or more sets of test electrical signals. The process logic 700 continues on to FIG. 7b, FIG. 7c and/or FIG. 7d.

Figure 7B:
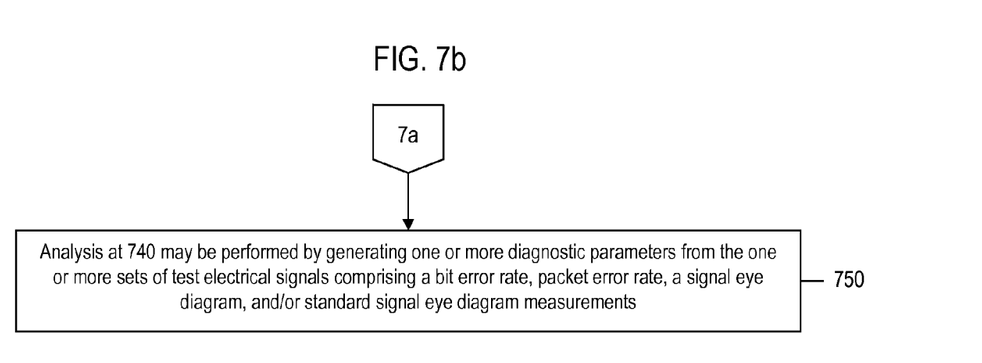

Referring to FIGS. 7b, 7c and 7d, the traffic detection and stress generation process logic 700 continues with several options or branches as shown. In FIG. 7b, at 750, a first option is shown in which the analysis at 740 may be performed by generating the one or more diagnostic parameters that may include BERT, PERT, generating a signal eye diagram, and/or computing standard signal eye diagram measurements, as described previously.

Figure 7C:
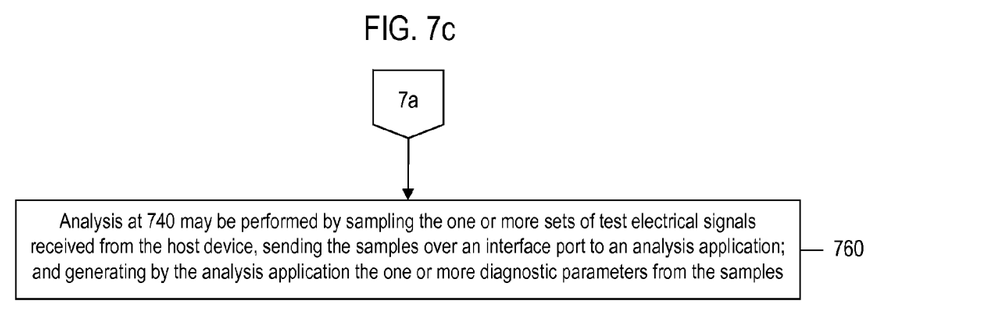

In FIG. 7c, at 760, a second option is shown in which the analysis at 740 may be performed by sampling the one or more sets of test electrical signals received from the host device, sending the samples over an interface port to an analysis application, and generating by the analysis application the one or more diagnostic parameters from the samples.

Figure 7D:
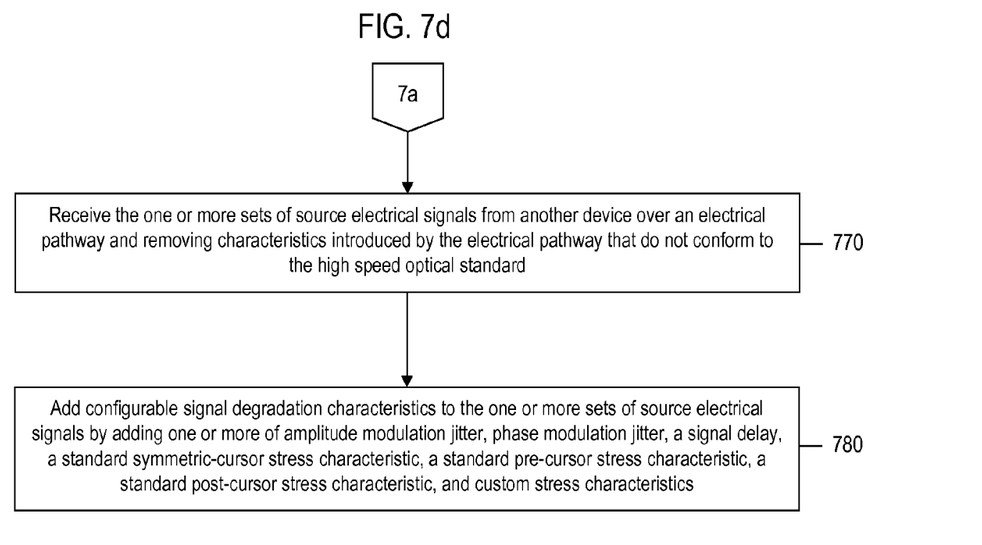

In FIG. 7d, at 770, a third option is shown in which the one or more sets of source electrical signals are received from another device over an electrical pathway. The characteristics introduced by the electrical pathway that do not conform to the high speed optical standard are removed, e.g., using the signal processing techniques described above. At 780, configurable signal degradation characteristics are added to the one or more sets of source electrical signals by, for example, adding one or more of amplitude modulation jitter, phase modulation jitter, a signal delay, a standard symmetric-cursor stress characteristic, a standard pre-cursor stress characteristic, a standard post-cursor stress characteristic, and custom stress characteristics. Parameters for the signal degradation characteristics may be selected as the first predetermined number of configurable signal processing parameters described at 710.

In another example, the configurable signal degradation characteristics are selected via a user interface and information associated with the configurable signal degradation characteristics is displayed on the user interface. These options will be described hereinafter in connection with FIG. 8.

In a further example, the one or more sets of test electrical signals received from the host may be recorded and one or more diagnostic parameters may be generated from the recorded signals. Alternatively, signal samples may be recorded. The recorded signal or samples may be used as a basis for comparison with later tests, for generating diagnostic parameters, or sent or retrieved from external applications or devices.

In summary, when two test cards operate in tandem as shown in FIG. 1, the signals generated by the host card 120(1) will enter test card 130(1). The signals are recorded and BER is calculated. The signals are sampled to generate the eye diagram. The data is then transferred through a USB port to a separate software application running on a PC to extract eye parameters, e.g., eye masks with a number of hits calculation, rise time, fall time, amplitude level, overshoot, undershoot, jitter edge, eye crossing, or other parameters as describe above. Optionally, the I2C MDIO interface may be used and the diagnostic software may be incorporated into the IOS or diagnostic software on the host and/or line card.

While the recorded portion of the signals is processed in test card 130(1), the signals are sent from the test card 130(1) through the TWINAX cables to the test card 130(2). At an SSS module of test card 130(2) the signals are "cleaned" using the EDC functions the test card 130(2) to remove any signal impairments, e.g., induced by the TWINAX or connectors. After the clean up operation, new signals with added standard stresses (or any custom stress condition) are generated and sent to a host coupled to test card 130(2). As described above, the test cards need to be calibrated to include cursor stress calibration. The stress calibration is measured at the output of the test card that is normally coupled to the host cards, i.e., this point is defined at the end of the SubMiniature-A (SMA) connector of the test compliance board when the test card 130(2) is inserted into the host line card. SMA test points are well defined in the testing standards.

In the reverse direction, the signals generated by the host card 120(2) enter test card 130(2). The signals are recorded and BER is calculated. The signals are sampled to generate the eye diagram. The data may be transferred through a USB port to a separate software application running on a PC to extract eye parameters as describe above. While the recorded portion of the signals is processed in test card 130(2), the signals are sent from the test card 130(1) through the TWI-NAX cables to the test card 130(1). SSS module 220 of test card 130(1) cleans the signals using the EDC functions the test card 130(1) to remove any signal impairments. After the clean up, new signals with added stress are generated and sent to host card 120(2).

The calibration of test card 130(1) is the same as that for test card 130(2). Once calibrated, the bundle can be extracted or inserted several times and the calibration can be checked and adjusted several times. Since the length of the test cable is known, the tap coefficients or settings to get the stressors are almost the same as those for a quasi static condition, i.e., like the eye generated within the TWINAX cable.

Figure 8:
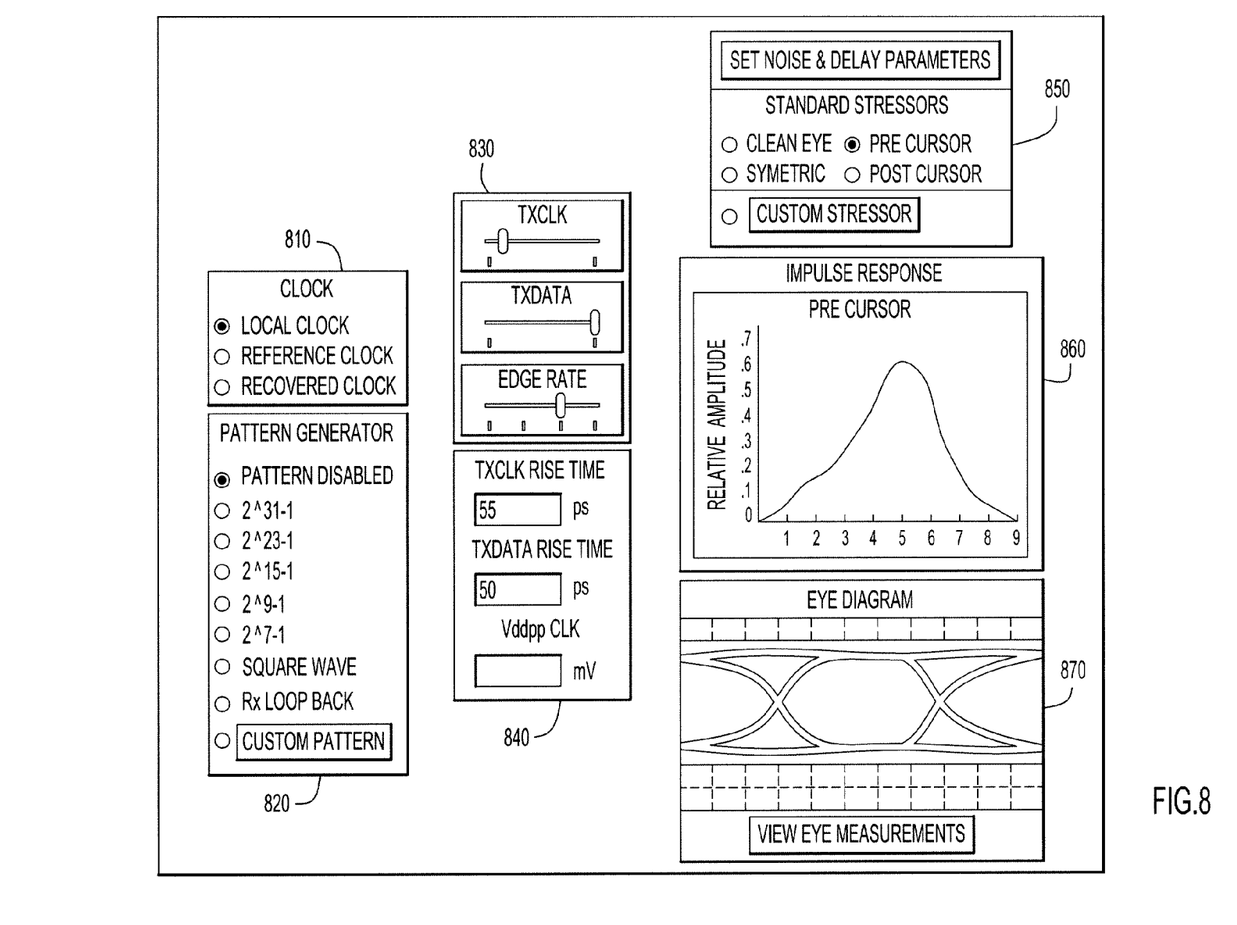
FIG. 8 is an example of a graphical user interface (GUI) that may be used to configure the scalable signal processing test card and view test results.

Turning now to FIG. 8, an example of a GUI is shown that may be used to configure a scalable signal processing test card and to view test results. The GUI has a clock selection radio button box 810, a pattern generator box 820, a TX clock and data amplitude, an edge rate selection section 830, a measured clock and data parameters section 840, a noise and data parameters selection section 850, a cursor response window 860, and an eye diagram section 870.

Clock selection box 810 allows a user to select a clock for test cards to use during data transfer and processing. The box 810 allows selection of a local on-board clock, e.g., a clock on the test card itself. A reference clock may be selected that is sent from the host card. The reference clock may be divided or multiplied to obtain a usable clock for data transfer. Alternatively, a clock signal may be recovered from data sent to the test card from the host card.

Pattern generator box 820 allows a user to select pattern generation or loopback modes used by the test card, usually when the card is in stand alone mode and not operated in tandem with another test card or device. Pattern generator box 820 shows a selection of test patterns, e.g., $2^{31}-1$ and $2^{23}-1$, among other test patterns. Different test patterns may be generated by selecting the "custom pattern" button.

TX clock and data amplitude, and edge rate selection section 830 has slider bars that allow a user to select TX clock amplitude or voltage, a TX data amplitude, and rise and fall rates for high and low bit transitions. The measured results of user selected clock and data parameters are shown in measured clock and data parameters section 840.

Noise and data parameters selection section 850 allows a user to select signal degradation parameters. The combination of the standard Long Range Multimode (LRM) cursor radio buttons, "custom cursor" button, and "set noise & delay parameters" button allows a user to configure all of the signal degradation parameters described above, e.g., those degradation parameters described above in connection with FIG. 5. A cursor impulse response for any selected cursor, if any, is shown in cursor response window 860.

A virtual eye diagram generated from host card electrical signals is shown in eye diagram section 870. Eye diagram section 870 allows the user to view eye measurements, e.g., amplitude and time measurements as described above by "clicking" the "view eye measurements" button.

When any of the buttons on the GUI are clicked, a pop-up window may be provided for the selected function. It is to be appreciated that any standard "windows" type functions, e.g., tabs or menus, may be implemented as part of the GUI application. Any of the functions described above may also be implemented via a Command Line Interface (CLI) of the host IOS.

A scalable signal processing test device and related signal processing techniques are provided herein for processing signals at a signal processing module of the scalable signal processing test device. Source electrical signals are processed to generate test electrical signals that model electrical signals produced by an optical module from received optical signals in accordance with a high speed optical standard for optical transmission. The test electrical signals are transmitted over transmit links to a host device that is configured to receive the test electrical signals in a format that would normally be produced by an optical module in accordance with the high speed optical standard. The test electrical signals are received after they have been looped back from the host device over receive links from the host device that is configured to output the test electrical signals in a format suitable for processing by an optical module in accordance with the high speed optical standard. The test electrical signals received from the host device are analyzed in order to determine whether the host device outputs the one or more sets of test electrical signals in compliance with the high speed optical standard. Thus, the test card can test host RX, processing, and TX in order to verify host operation.

In summary, a bundle link and tester system is described for testing interfaces at data rates of 40 G or higher. The dual test card bundle may also serve as data link between host cards using, e.g., standard form factors for CFP, CXP, QSP pluggable or fixed transceivers. The test bundle also allows data capture and replay of outgoing and incoming signals in either direction, the ability to generate waveforms with frequency or amplitude noise, and includes a separate port for test card configuration and to send captured data to an off-card application to allow post-processing, or offline waveform generation and analysis.

The test system described herein is orders of magnitude less expensive than optical test solutions that use optical pluggables. The test system is small, portable, and scalable to test multiple host card ports and provide obvious advantages over conventional "rack and stack" test solutions that only test one port at the time and do not have any means to connect to the host. Using the system described herein, two ports may be tested at the same time and used for overall system design verification. The TWINAX and signal amplification system supports greater interconnect spans, e.g., 20 meters, that are much greater than conventional interconnect spans, e.g., for example CX1 has a span up to only 7 meters. The test bundle also helps in debugging or healing a link when the test bundle supported by the host IOS.

The above description is by way of example only.

What is claimed is:

1. A method comprising:
   at a signal processing module of a scalable signal processing test device that is scalable to test a plurality of data rates, processing one or more sets of source electrical signals according to a first predetermined number of configurable signal processing parameters in order to generate one or more sets of test electrical signals that model electrical signals produced by an optical module from received optical signals in accordance with a plurality of high speed optical standards for optical transmission;
   selectively disabling and enabling individual transmit links of a scalable number of transmit links to match a number of enabled transmit links to one of the plurality of high speed optical standards; and
   transmitting the one or more sets of test electrical signals over the enabled transmit links to a host device that is configured to receive the one or more sets of test electrical signals in a format that would normally be produced by an optical module in accordance with the one of the plurality high speed optical standards;

wherein at least one of the plurality of transmit links is enabled when transmitting for each of the plurality of high speed optical standards.

2. The method of claim 1, and further comprising receiving the one or more sets of test electrical signals after they have been looped back from the host device over a predetermined number of receive links from the host device that is configured to output the one or more sets of test electrical signals in a format suitable for processing by an optical module in accordance with the one of the plurality high speed optical standards.

3. The method of claim 2, and further comprising analyzing the one or more sets of test electrical signals received from the host device according to a second predetermined number of configurable signal processing parameters in order to determine whether the host device outputs the one or more sets of test electrical signals in compliance with the one of the plurality high speed optical standards.

4. The method of claim 3, wherein analyzing comprises analyzing the one or more sets of test electrical signals received from the host device and generating one or more diagnostic parameters from the one or more sets of test electrical signals.

5. The method of claim 4, wherein generating comprises generating one or more of a bit error rate, a packet error rate, a signal eye diagram, or standard signal eye diagram measurements.

6. The method of claim 3, further comprising:
sampling the one or more sets of test electrical signals received from the host device; and
sending the samples over an interface port to an analysis application; and
generating by the analysis application the one or more diagnostic parameters from the samples.

7. The method of claim 3, further comprising recording the one or more sets of test electrical signals received from the host, wherein analyzing comprises generating one or more diagnostic parameters from the recorded signals.

8. The method of claim 1, and further comprising receiving the one or more sets of source electrical signals from another device over an electrical pathway, and wherein processing comprises removing characteristics introduced by the electrical pathway that do not conform to the one of the plurality high speed optical standards.

9. The method of claim 1, and further comprising receiving the one or more sets of source electrical signals from the host device.

10. The method of claim 1, and further comprising generating the one or more sets of source electrical signals according to a configurable bit pattern.

11. The method of claim 1, wherein processing comprises adding configurable signal degradation characteristics to the one or more sets of source electrical signals to generate the one or more sets of test electrical signals.

12. The method of claim 11, wherein adding comprises adding one or more of amplitude modulation jitter, phase modulation jitter, a signal delay, a standard symmetric-cursor stress characteristic, a standard pre-cursor stress characteristic, a standard post-cursor stress characteristic, and custom stress characteristics.

13. The method of claim 11, further comprising:
selecting the configurable signal degradation characteristics via a user interface; and
displaying information associated with the configurable signal degradation characteristics on the user interface.

14. The method of claim 1, and further comprising amplifying the one or more sets of source electrical signals with a gain that is configured to account for attenuation of the one or more sets of source electrical signals when transmitted over an electrical cable to another device and so as to model optical transmission of optical signals derived from the one or more sets of source electrical signals over an optical fiber.

15. The method of claim 1, wherein performing signal processing comprises configuring one or more test parameters of the scalable signal processing test device comprising a clock source, clock signal parameters, and data signal parameters.

16. An apparatus comprising:
a first connector configured to be coupled to a host device according to a first form factor pluggable standard;
a second connector configured to be coupled to an electrical cable;
a scalable signal processing module that is scalable to test a plurality of data rates, configured to:
process one or more sets of source electrical signals according to a first predetermined number of configurable signal processing parameters in order to generate one or more sets of test electrical signals that model electrical signals produced by an optical module from received optical signals in accordance with a plurality of high speed optical standards for optical transmission;
selectively disable and enable individual transmit links of a scalable number of transmit links to match a number of enabled transmit links to one of the plurality of high speed optical standards; and
transmit the one or more sets of test electrical signals over the enabled transmit links in the first connector to a host device that is configured to receive the one or more sets of test electrical signals in a format that would normally be produced by an optical module in accordance with the one of the plurality high speed optical standards:
wherein at least one of the plurality of transmit links is enabled when transmitting for each of the plurality of high speed optical standards.

17. The apparatus of claim 16, wherein the signal processing module is further configured to:
receive the one or more sets of test electrical signals after they have been looped back from the host device over a predetermined number of receive links in the first connector from the host device that is configured to output the one or more sets of test electrical signals in a format suitable for processing by an optical module in accordance with the one of the plurality high speed optical standards; and
analyze the one or more sets of test electrical signals received from the host device according to a second predetermined number of configurable signal processing parameters in order to determine whether the host device outputs the one or more sets of test electrical signals in compliance with the one of the plurality high speed optical standards.

18. The apparatus of claim 17, wherein the signal processing module is configured to analyze the one or more sets of test electrical signals received from the host device in order to generate one or more diagnostic parameters comprising one or more of a bit error rate, a packet error rate, a signal eye diagram, or standard signal eye diagram measurements.

19. The apparatus of claim 16, wherein the signal processing module is further configured to receive the one or more sets of source electrical signals via the second connector over an electrical cable, and wherein the signal processing module is configured to process the one or more sets of source electrical signals by removing characteristics introduced by the electrical cable that do not conform to the one of the plurality high speed optical standards.

20. The apparatus of claim 16, wherein the signal processing module is configured to generate the one or more sets of test electrical signals by adding configurable signal degradation characteristics to the one or more sets of source electrical signals.

21. The apparatus of claim 16, wherein the signal processing module is further configured to amplify the one or more sets of source electrical signals with a gain that is configured to account for attenuation of the one or more sets of source electrical signals when transmitted over the electrical cable to another device and so as to model optical transmission of optical signals derived from the one or more sets of source electrical signals over an optical fiber.

22. The apparatus of claim 16, further comprising:
   an interface port; and
   a controller configured to:
      record the one or more sets of test electrical signals received from the host;
      sample the one or more sets of test electrical signals received from the host device; and
      send the samples over an interface port to an analysis application or via the first connector to the host device.

23. A system comprising:
   a first test card, a second test card, and an electrical cable that is configured to connect between the first test card and the second test card;
   the first test card comprising:
      a first connector configured to be coupled to a first host device according to a first form factor pluggable standard;
      a second connector configured to be coupled to the electrical cable;
      a signal processing module configured to:
         process one or more sets of source electrical signals according to a first predetermined number of configurable signal processing parameters in order to generate one or more sets of test electrical signals that model electrical signals produced by an optical module from received optical signals in accordance with a high speed optical standard for optical transmission; and
         transmit the one or more sets of test electrical signals over a predetermined number of transmit links in the first connector to a first host device that is configured to receive the one or more sets of test electrical signals in a format that would normally be produced by an optical module in accordance with the high speed optical standard;
   the second test card comprising:
      a first connector configured to be coupled to a second host device according to a first form factor pluggable standard;
      a second connector configured to be coupled to the electrical cable;
      a signal processing module configured to:
         process one or more sets of source electrical signals according to a first predetermined number of configurable signal processing parameters in order to generate one or more sets of test electrical signals that model electrical signals produced by an optical module from received optical signals in accordance with the high speed optical standard for optical transmission; and
         transmit the one or more sets of test electrical signals over a predetermined number of transmit links in the first connector to a second host device that is configured to receive the one or more sets of test electrical signals in a format that would normally be produced by an optical module in accordance with the high speed optical standard.

24. The system of claim 23, wherein at least one of the signal processing module of the first test card and the signal processing module of the second test card is further configured to:
   receive the one or more sets of test electrical signals after they have been looped back from the host device over a predetermined number of receive links in the first connector from the host device that is configured to output the one or more sets of test electrical signals in a format suitable for processing by an optical module in accordance with the high speed optical standard; and
   analyze the one or more sets of test electrical signals received from the host device according to a second predetermined number of configurable signal processing parameters in order to determine whether the host device outputs the one or more sets of test electrical signals in compliance with the high speed optical standard.

25. The system of claim 23, wherein at least one of the signal processing module of the first test card and the signal processing module of the second test card is further configured to receive the one or more sets of source electrical signals via the second connector over an electrical cable, and wherein the signal processing module is configured to process the one or more sets of source electrical signals by removing characteristics introduced by the electrical cable that do not conform to the high speed optical standard.

26. The system of claim 23, wherein at least one of the signal processing module of the first test card and the signal processing module of the second test card is configured to generate the one or more sets of test electrical signals by adding configurable signal degradation characteristics to the one or more sets of source electrical signals.

27. A non-transitory processor readable medium encoded with instructions that, when executed by a processor, cause the processor to:
   process one or more sets of source electrical signals to test a plurality of data rates according to a first predetermined number of configurable signal processing parameters in order to generate one or more sets of test electrical signals that model electrical signals produced by an optical module from received optical signals in accordance with a plurality of high speed optical standards for optical transmission;
   selectively disable and enable individual transmit links of a scalable number of transmit links to match a number of enabled transmit links to one of the plurality of high speed optical standards; and
   output the one or more sets of test electrical signals over the enabled transmit links to a host device that is configured to receive the one or more sets of test electrical signals in a format that would normally be produced by an optical module in accordance with the one of the plurality high speed optical standards;

wherein at least one of the plurality of transmit links is enabled when transmitting for each of the plurality of high speed optical standards.

28. The non-transitory processor readable medium of claim 27, further comprising instructions that, when executed by a processor, cause the processor to:
receive the one or more sets of test electrical signals after they have been looped back from the host device over a predetermined number of receive links from the host device that is configured to output the one or more sets of test electrical signals in a format suitable for processing by an optical module in accordance with the one of the plurality high speed optical standards; and
analyze the one or more sets of test electrical signals received from the host device according to a second predetermined number of configurable signal processing parameters in order to determine whether the host device outputs the one or more sets of test electrical signals in compliance with the one of the plurality high speed optical standards.

29. The non-transitory processor readable medium of claim 28, wherein the instructions that cause the processor to analyze comprise instructions to analyze the one or more sets of test electrical signals received from the host device in order to generate one or more diagnostic parameters comprising one or more of a bit error rate, a packet error rate, a signal eye diagram, or standard signal eye diagram measurements.

30. The non-transitory processor readable medium of claim 27, further comprising instructions that, when executed by a processor, cause the processor to receive the one or more sets of source electrical signals via the second connector over an electrical pathway, and wherein the signal processing module is configured to process the one or more sets of source electrical signals by removing characteristics introduced by the electrical pathway that do not conform to the one of the plurality high speed optical standards.

31. The non-transitory processor readable medium of claim 27, wherein the instructions that cause the processor to generate one or more sets of test electrical signal comprise instructions to generate one or more sets of test electrical signals by adding configurable signal degradation characteristics to the one or more sets of source electrical signals.

32. The non-transitory processor readable medium of claim 27, further comprising instructions that, when executed by a processor, cause the processor control an amplifier to amplify the one or more sets of source electrical signals with a gain that is configured to account for attenuation of the one or more sets of source electrical signals when transmitted over an electrical cable to another device and so as to model optical transmission of optical signals derived from the one or more sets of source electrical signals over an optical fiber.

* * * * *